Figure 1:
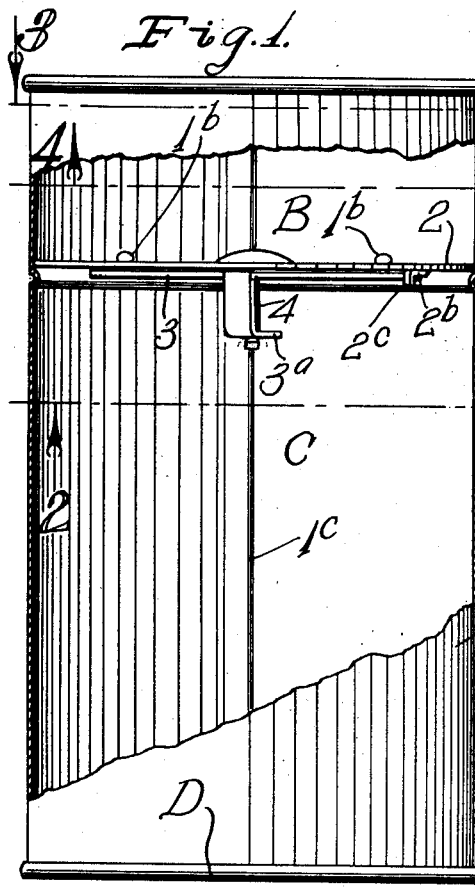

June 29, 1943. E. HANSON 2,323,036
CREAM SEPARATING MILK CONTAINER
Filed Oct. 8, 1940

INVENTOR.
Ezekiel Hanson
BY A.B.Bowman
ATTORNEY.

Patented June 29, 1943

2,323,036

UNITED STATES PATENT OFFICE 2,323,036

CREAM SEPARATING MILK CONTAINER

Ezekiel Hanson, San Diego, Calif.

Application October 8, 1940, Serial No. 360,254

5 Claims. (Cl. 210—51.5)

My invention relates to a cream separating milk container, more particularly for use in partitioning the cream from the milk after the cream has risen therein so that the cream is easily separated from the milk by pouring the cream from the opposite side of a gravity actuated closing gate positioned substantially at the natural cream line formation line in the container and the objects of my invention are:

First, to provide a cream separating milk container of this class in which the container may be any size or shape desired or made of various materials in which a partition is positioned substantially at the cream line formation line and provided with an opening therein arranged to be closed and opened as desired by a pivotally mounted gravity actuated gate member;

Second, to provide a cream separating milk container of this class from which either the separated cream or milk or the mixed cream and milk may be poured from the container as desired, the cream first and the milk last or the milk first and the cream last, or both together as desired;

Third, to provide a cream separating milk container of this class in which the cream may be partitioned from the milk in such a manner as to prevent the cream and milk from being mixed during normal transit and handling;

Fourth, to provide a cream separating milk container of this class in which a partition is positioned and provided with an opening therein arranged to form a passageway for the rising cream, which opening is easily closed by rotatably tilting the container causing a gravity actuated gate therein to close said opening or open the same by similarly tilting the container in the opposite direction;

Fifth, to provide a cream separating milk container of this class in which a partition closing gravity actuated gate is freely pivotally mounted and arranged to operate by gravitational attraction with the rotary tilting of the container;

Sixth, to provide a novel cream separating milk container of this class;

Seventh, to provide a cream separating milk container of this class which may be used in connection with the sale of milk or which may be used only as a cream separator for repeatedly separating cream from milk and which may be readily sterilized; and Eighth, to provide a cream separating milk container of this class which is very simple and economical of construction, efficient in its action and which will not readily deteriorate or get out of order.

Figure 3:
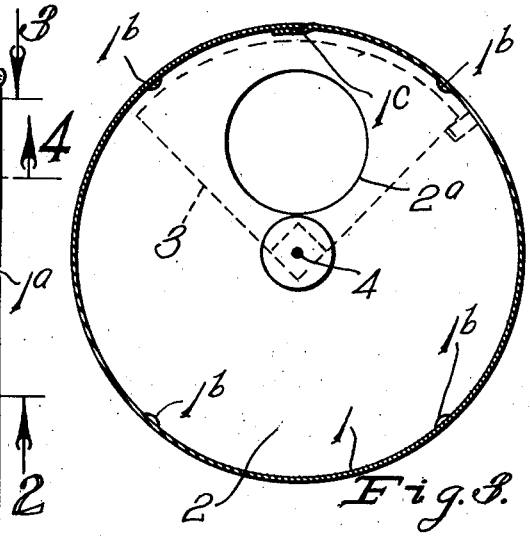
Figure 4:
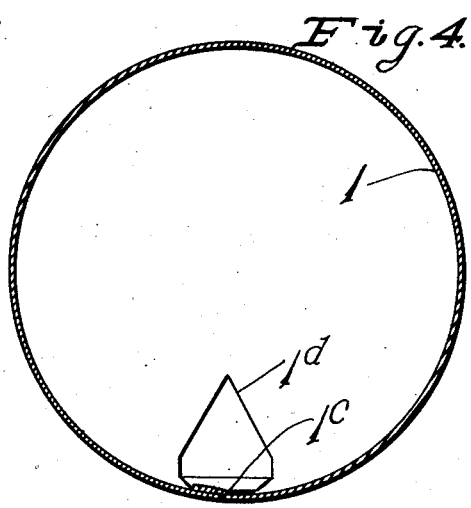
Figure 2:
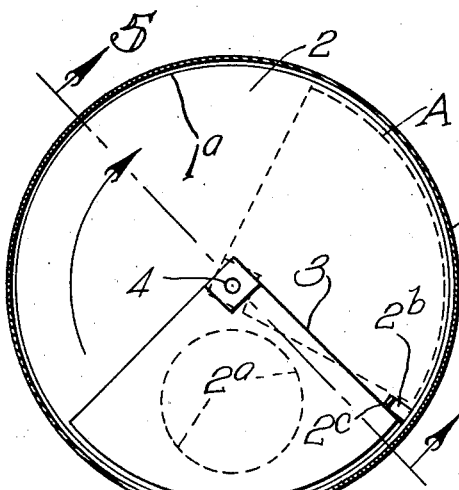
Figure 5:
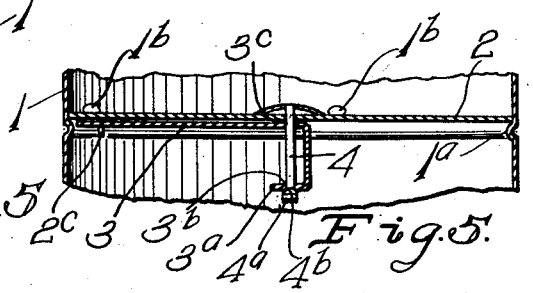

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side elevational view of my cream separating milk container showing portions broken away and in section to facilitate the illustration; Fig. 2 is a transverse sectional view taken from the line 2—2 of Fig. 1 showing by dash lines a varying position of a part thereof; Fig. 3 is a transverse sectional view taken from the line 3—3 of Fig. 1; Fig. 4 is a transverse sectional view taken from the line 4—4 of Fig. 1 and Fig. 5 is a fragmentary sectional view taken from the line 5—5 of Fig. 2.

Similar characters of reference refer to similar parts and portions throughout the several views of the drawing.

The container member 1, partition member 2, gate member 3 and the gate supporting pin 4 constitute the principal parts and portions of my cream separating milk container.

The container member 1 is hollow and, as shown, cylindrical in form being similar to a conventional tin can. The annular side wall of this container member 1, some distance from the upper end thereof, is provided with an annular indented portion 1a, which annular indented portion 1a forms an internal ledge in the container member 1 upon which is positioned the partition member 2. This partition member 2 is arranged to engage the annular indented portion 1a at its periphery and the container member 1 is provided with indented punched portions 1b arranged to engage the opposite side of the partition 2 from the annular indented portion 1a so that the partition member 2 is prevented from shifting longitudinally of the container member 1.

It will be here noted that the position of the partition member 2 is substantially the natural cream line formation line of whole milk when the container member 1 is filled by the same. This partition member 2 is provided with an opening 2a therein which opening 2a provides a passageway for the cream rising upwardly in the container member 1. It will be here noted that this opening 2a is in radial alignment with the seam portion 1c of the container member 1 so that the position of the opening 2a in the partition 2 is easily determined by examination of the outer side of the container member 1.

The gate supporting pin 4 is soldered at its upper end in the upper side of the partition member 2 and is arranged to support the gate member 3 in the relation as shown best in Figs. 1 and 5 of the drawing. The gate member 3 is pivotally mounted on the gate supporting pin 4 and is provided with a substantially U-shaped portion through which the gate supporting pin 4 extends, as shown best in Fig. 5 of the drawing. This gate member 3 is a flat plate-like member provided with a downwardly and angularly extending portion 3a which forms a nearly frictionless bearing for the gate supporting pin 4 which extends through openings 3b and 3c in said angularly extending portion 3a and the gate member 3 respectively, as shown best in Fig. 5 of the drawing. The gate supporting pin 4 is provided with the head portion 4a which is substantially arcuate at its bearing point 4b at one end of the angularly extending portion 3a of the gate member 3, all as shown best in Fig. 5 of the drawing. Connected with the under side of the partition members 2 is an angular stop member 2b which is arranged to limit the pivotal movement of the gate member 3 in either direction upon the gate supporting pin 4, as indicated by dash lines in Fig. 2 of the drawing. This stop portion 2b is provided with a downwardly extending portion 2c which is arranged to stop the pivotal shifting of the gate member 3 at its dash line position A in Fig. 2 of the drawing, or the solid line position therein. It will be noted that when the gate member 3 is in the dash line position A, as shown in Fig. 2 of the drawing, the partition opening 2a is unobstructed. When the gate member 3 is positioned in the solid line position, as shown in Fig. 2 of the drawing, the partition opening 2a is closed and surrounded by relatively wide marginal overlapping portions of the gate member 3 and in this relation the partition member 2 and the gate member 3 form a substantially solid non-leaking partition opposed to the passage of milk or cream from the compartment B to the compartment C of the container member 1, or from the compartment C to the compartment B, all as shown best in Figs. 1 and 2 of the drawing.

The operation of my cream separating milk container is substantially as follows:

When the container member 1 is filled with whole milk and the gate member 3 is positioned in the dash line position A, as shown best in Fig. 2 of the drawing, the cream from the whole milk rises into the compartment B of the container member 1 above the partition 2 through the opening 2a. After the cream has ascended into the compartment B, any person wishing to pour the cream from the container member 1 separately of the milk therein may proceed as follows:

A conventional rim engaging can opener may be employed to form an opening 1d therein, as shown best in Fig. 4 of the drawing. The container member 1 is then rotatably tilted so that the gate member 3 shifts from the dash line position A to the solid line position, as shown best in Fig. 2 of the drawing, closing the partition opening 2a, trapping the cream in the compartment B and the separated milk in the compartment C.

It will be here noted that the partition opening 2a is in radial alignment with the seam portion 1c of the container member 1. Therefore the operator, when executing the opening 1d, as shown best in Fig. 4 of the drawing, forms the same in radial alignment with the container seam portion 1c so that the opening 1d will coincide radially with the partition opening 2a in the partition 2, all as shown best in Figs. 3 and 4 of the drawing.

When the cream is in the compartment B and the gate member is in the solid line position, as shown best in Fig. 2 of the drawing, the cream may be poured through the opening 1d formed by the conventional can opener and then by rotatably tilting the container member 1, the gate member 3 is shifted to the dash line position A, as shown best in Fig. 2 of the drawing and the milk may be poured from the compartment C through the opening 2a in the partition member 2 and outwardly through the opening 1d formed in the top of the container member 1 by the conventional can opener, as shown best in Fig. 4 of the drawing. If a person desires to pour the milk from the compartment C leaving the cream in the compartment B, the gate member 3 is shifted to the solid line position, as shown in Fig. 2 of the drawing by a rotary tilting movement and the container member 1 is inverted having its end portion D uppermost. The operator then forms an opening in the end portion D of the container member 1 similar to the opening 1d, as shown best in Fig. 4 executed by a conventional can opener. The milk may be poured from the compartment C through the opening in the end portion D of the container member 1. The cream may then be poured through the same opening by first jarring and shifting the gate member 3 to the dash line position, as shown in Fig. 2 of the drawing. If it is desired to pour the cream and milk together in mixed relation from the container member 1, the gate member 3 is positioned in the dash line position A as shown in Fig. 2 of the drawing and the container member 1 may be shaken causing the cream and milk to mix through the opening 2a in the container member 1. Then the mixed milk and cream may be poured from whichever end of the container member 1 is opened as hereinbefore described.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A cream separating milk container of the class described, consisting of a hollow container member, a partition member positioned therein provided with an opening in said partition member, and a gate member shiftably mounted on said partition member and arranged to be shifted and positioned over and off of said opening in said partition member by tilting and rotating said hollow container in the desired direction.

2. A cream separating milk container of the class described, consisting of a hollow container member, a partition member positioned therein provided with an opening in said partition member, and a gate member shiftably mounted on said partition member and arranged to be shifted and positioned over and off of said opening in said partition member by tilting and rotating said hollow container in the desired direction, said partition member positioned at substantially the cream line formation line relatively with the internal displacement area of said container member.

3. A cream separating milk container of the class described, consisting of a hollow container member, a partition member positioned therein provided with an opening in said partition member, a gate member shiftably mounted on said partition member and arranged to be shifted and positioned over and off of said opening in said partition member by tilting and rotating said hollow container in the desired direction, said partition member positioned at substantially the cream line formation line relatively with the internal displacement area of said container member, and a gate supporting pin secured to said partition member, said gate member pivotally mounted on said gate member supporting pin.

4. A cream separating milk container of the class described, consisting of a hollow container member, a partition member positioned therein provided with an opening in said partition member, a gate member shiftably mounted on said partition member and arranged to be shifted and positioned over and off of said opening in said partition member by tilting and rotating said hollow container in the desired direction, said partition member positioned at substantially the cream line formation line relatively with the internal displacement area of said container member, and a gate supporting pin secured to said partition member, said gate member pivotally mounted on said gate member supporting pin, said gate member provided with a downwardly and angularly extending portion through which said gate supporting pin extends.

5. A cream separating milk container of the class described, consisting of a hollow container member, a partition member positioned therein provided with an opening in said partition member, a gate member shiftably mounted on said partition member and arranged to be shifted and positioned over and off of said opening in said partition member by tilting and rotating said hollow container in the desired direction, said partition member positioned at substantially the cream line formation line relatively with the internal displacement area of said container member, and a gate supporting pin secured to said partition member, said gate member pivotally mounted on said gate member supporting pin, said gate member provided with a downwardly and angularly extending portion through which said gate supporting pin extends, said container provided with an annular indented portion arranged to engage one side of said partition member at its periphery and also provided with punched indented portions arranged to engage the opposite side of said partition member at its periphery.

EZEKIEL HANSON.